Aug. 23, 1966  R. A. OLDHAM  3,268,692
FUSE BLOCK FOR EITHER SINGLE-POLE OR DOUBLE-POLE POWER SUPPLY
Filed April 24, 1964
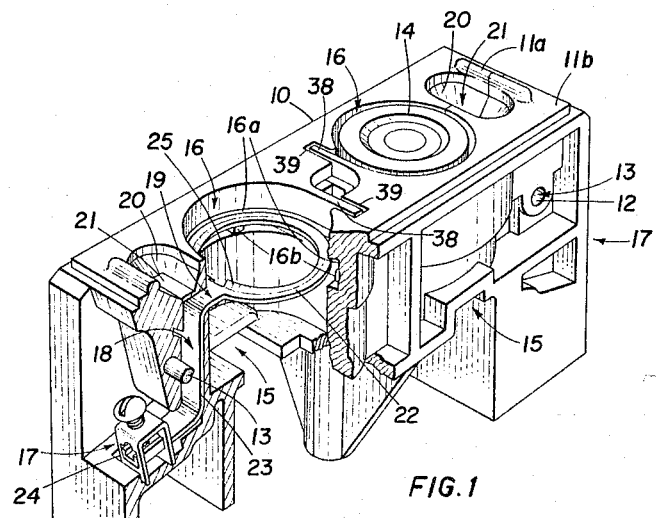
Inventor
ROBERT ALEXANDER OLDHAM
by: Emery, Whittemore,
Sandoe & Graham.

3,268,692
FUSE BLOCK FOR EITHER SINGLE-POLE OR
DOUBLE-POLE POWER SUPPLY
Robert Alexander Oldham, Willowdale, Ontario, Canada, assignor to General Cable Corporation, New York, N.Y., a corporation of New Jersey
Filed Apr. 24, 1964, Ser. No. 362,303
Claims priority, application Canada, Feb. 5, 1964, 894,878
6 Claims. (Cl. 200—133)

This invention relates to a plastic moulded housing element adapted for assembly with a like element to form a housing for a single pole or two pole fuse block and to a single pole and a two pole fuse block incorporating the said housing.

A common type of fuse panel arrangement for a single-phase three wire power supply system comprises a pair of bus bars mounted in a suitable retaining block and connected to two of the three wires; the two wires being at opposite potential typically of 110 volts each and a third wire being a neutral conductor, whereby the voltage across the bus bars is twice, i.e. 220 volts, that across either of the bus bars and the neutral conductor, i.e. 110 volts. Various forms of fuse blocks may be mounted on the bus bars for branch circuit supply. One such fuse block may be of the two branch single-pole type, being designed for protection of two separate, individual 110 volt loads, requiring only the voltage across one bus bar and neutral. Another different form of fuse block, may be of the two-pole type being designed for protection of a single 220 volt load requiring the full voltage developed across the bus bars. Due to safety regulations which require complete isolation of the load from voltage when the same is being serviced the two types of fuse blocks have, heretofore, differed considerably in design, with the result that tooling and installation costs have been higher and inventories greater than might otherwise have been necessary. Attempts to provide a standardized more versatile fuse block have resulted in devices which have been cumbersome and expensive or alternatively simple but in other respects unsatisfactory and permitted partial isolation in some cases resulting in danger to life.

Accordingly it is an object of this invention to provide a standard fuse block housing which may be assembled with appropriate components into a fuse block of either the single pole or double pole type of supply.

It is another object of this invention to provide a simple and inexpensive single pole and two pole protective fuse unit. It is a further feature of the invention to provide a segmented fuse block designed to provide a protracted creep path between adjacent fuse rings mounted therein.

In accordance with an aspect of the invention there is provided a two branch plug-type fuse block comprising an insulating housing assembled from two complementary moulded half sections; said housing having knock out portions of reduced section therein superjacent the load connector passageways in said block and readily fracturable for removable insertion in said passageways of conductive dagger elements for bridging a discontinuous load lead therein.

The above mentioned and other features and objects of the invention and the manner of attaining them will become more apparent by reference to the following description of an embodiment of the invention taken in conjunction with the accompanying drawings wherein:

FIGURE 1 is a perspective view of a fuse block in accordance with the invention with a portion thereof cut away to show details of construction and showing a fuse ring and load connector suitable for single pole 110 volt supply;

FIGURE 2 is a perspective view of a fuse block associated with dagger elements to provide for two pole 220 volt supply;

FIGURE 3 is an enlarged sectional view of a portion of the fuse block of FIGURE 2 showing in outline the details of the modified fuse ring and load connector as used therein; and, FIGURE 4 is an enlarged perspective view of the modified fuse ring and load connector of FIGURE 3.

Referring now to the drawings the fuse block 10 is shown, generally to comprise two complementary moulded plastic half sections 11a and 11b adapted to be secured together in longitudinal complementary relation by suitable connecting means, such as rivets 12 or the like passing through holes 13 to form an insulated block 10 or housing for fuses 14 and their associated connectors described below.

In this preferred embodiment sections 11a and 11b are preferably made of phenol formaldehyde type thermosetting resins however other insulating and plastic material may prove more desirable in some applications.

Fuse block 10 is characterized by a pair of parallel bus bar passageways 15 extending transversely therethrough for mounting of the fuse block 10 cross-wise on a pair of panel board bus bars not shown. A pair of spaced apart aligned fuse receptacles 16 are symmetrically located longitudinally of the housing and extend downwardly therein for communication with a respective bus bar passageway 15. A pair of load terminal wells 17 are located in each end of the block 10 and a pair of load connector passageways 18, one each communicating a respective fuse receptacle 16 with an adjacent terminal well 17 are formed in the interior of block 10. As will be seen from FIGURE 1 the passageways 18 communicate with the upper half section of a respective fuse receptacle 16 through the opening 19, extend substantially horizontally outwardly therefrom toward an adjacent end of the housing 14, and then substantially vertically downwardly for communication with a respective terminal well 17. Fuse receptacles 16 are each provided with a peripheral groove 16a and abutments 16b spaced somewhat below the surface of block 10.

Housing 14 is further characterised by depressions 20 located between each fuse receptacle 16 and an adjacent end of the housing superjacent the vertical portion 18a of passageways 18 and separated therefrom by knockouts 21 of reduced section readily fracturable for gaining access to the passageways 18 aforesaid.

In the embodiment of FIGURE 1 moulded sections 11a and 11b are joined together to form a fuse block 10 for a pair of fuse rings 22, associated load terminals 23 and continuous load leads 24 extending therebetween to provide a standard type single pole fuse block 10 for supplying 110 volts to two separate individual 110 volt loads. This arrangement is illustrated in FIGURE 1 (one half being cut away since each end of the block is identical), wherein there is shown fuse ring 22 seated within groove 16a against abutments 16b in fuse receptacle 16. Load lead 23 formed integrally with ring 22 extends through opening 19 down through passageway 18 to the load terminal well 17 for connection with load terminal 24. Ring 22 is provided with angled lip 25 for threaded engagement with a fuse 14 in known manner, and ring 22 is continuous to provide improved strength and useful life as compared with known forms of discontinuous fuse rings of the prior art.

In order to provide for supply of 220 volts to a single 220 volt load, fuse block 10 may be adapted in accordance with the arrangements shown in FIGURE 3 wherein there is shown a fuse ring 26 seated with fuse receptacle 16 in the aforesaid manner having a ring lead member 27, formed integrally thereof, extending through the opening 19 into the upper reaches of the passageway 18. The free end of lead member 27 has an inturned contact 28 thereon which is biased to extend diagonally across passageway 18 as shown in phantom in FIGURE 3. Load terminal 24 located in terminal well 17 has connected thereto a terminal lead member 29 which extends upwardly into passageway 18 and having a free end cut out to form two rigid arms 30 lying in close contact with the side wall of passageway 18 said arms 30 terminating in tongues 31 angled thereto and fitting within grooves 32 extending from passageway 18. A third resilient arm 33, defined by the struck out portion between arms 30, extends partially across passageway 18 and is formed with an angled tongue 34 lying in a normal position closely adjacent to the plane of arms 30 and being resiliently separable therefrom to provide a spring clamping action therebetween. To complete the circuit between lead members 27 and 29 in this latter arrangement there is provided a pair of conductive probes or daggers 35, mounted on the respective ends 36 of an insulated yoke 37. Daggers 35 are spaced from one another a distance corresponding to the distance between passageways 18 and are adapted to be removably inserted simultaneously, into the passageways through the recesses 20 access being obtained by fracture of knock outs 21 to contact tongues 28 and arms 30 and tongues 34 and bridge the gap therebetween. Yoke 37 and daggers 35 are so dimensioned that when daggers 35 are located within passageways 18 as aforesaid inspection ports 37a formed therein register with respective fuses 14 for visual checking thereof and yoke 37 spans the receptacles 16 above fuses 14 operatively secured therein so that either fuse 14 cannot be removed without lifting the daggers 35 out of the fuse block 10 thus breaking conductive electrical contact between both fuses 14 and their associated load connectors 24 simultaneously.

In addition to the foregoing features housing sections 11a and 11b in the area between fuse receptacles 16 are provided with projecting shoulder portions 38 in each section 11a and 11b adapted to be received within a corresponding complementary recess 39 formed in the mating section 11a or 11b respectively. Shoulders 38 thus provide a relatively long electrical "creep path" between fuse rings 22, and between fuse ring 22 and hold down screw 40 which permits the use of continuous rather than the usual split-type ring.

While receptacles 16 and rings 22 are shown to be adapted for threaded reception of a circular fuse 14 it will be appreciated that one or other or both may be modified in shape and configuration to receive a plug-type fuse of different design without departing from the concept of the invention.

In use, sections 11a and 11b are assembled in the manner illustrated, with appropriate fuse ring and load lead elements, to provide either a single pole or two pole fuse block having a standard housing. The single pole block is used in the usual manner, that is, it is mounted on a pair of panel board bus bars (not shown) through passageways 15, fuses 14 are screwed into each fuse receptacle 16 to contact a respective bus bar and terminals 24 are connected to separate 110 volt loads (not shown). The two pole block is mounted in the same way upon a pair of bus bars, fuses are positioned in receptacles 16 to contact the bars, a single 200 volt load is connected between terminals 24, the knock outs 21 of reduced section are fractured and daggers 35 carried by yoke 37 are inserted into passageways 18 in the manner aforesaid. In order to replace a broken fuse it is necessary to remove yoke 37 thus breaking contact between leads 25, 27 and completely isolating the load from voltage. Further, if it is desired to work on the load yoke 37 can be conveniently removed from the block to render the load safe to work upon.

The foregoing is a description of preferred embodiments and it will be understood that various modifications in design may be resorted to without departing from the spirit of the invention and the scope of the appended claims.

What I claim is:

1. A fuse block including in combination two electrical insulating elements having complementary recesses and confronting faces thereof in position to form openings and passageways in the fuse block formed by bringing the insulating elements together with said confronting faces extending from the top surface of the block downward, fastening means for holding said elements together, the recesses formed in the assembled fuse block including two fuse holding recesses opening through a top surface of the block, a bus bar passage extending from front to back of the fuse block under each of the fuse holding recesses and with which the fuse holding recess communicates, load terminal wells at opposite ends of the block, a load lead passageway connecting each terminal well with the fuse holding recess nearest to that terminal well, the load lead passages being closed at both sides by front and back walls of the respective insulating elements, grooves in recesses of one insulating element registering at said confronting faces with corresponding grooves in the other insulating element, and conductor elements in the fuse block held in place by said grooves and removable and replaceable when the insulating elements are separated at said confronting faces.

2. The fuse block described in claim 1 characterized by load terminal in each well, a conductor in each fuse holding recess, a discontinuous conductor in each load lead passageway between the load terminal and the conductor in the adjacent fuse holding recess, a dagger that is insertable into each load lead passageway to bridge the discontinuity in said discontinuous conductor in that load lead passageway, a cover to which both of the daggers are secured and which is held on the fuse block by insertion of the daggers into said load lead passageways, and openings in the cover in register with the fuse holding recesses for inspection of fuses in said recesses.

3. The fuse box described in claim 2 characterized by a continuous conductor that fits within each load lead passageway in place of the discontinuous conductor, the insulating elements having thin walls integral with the remainder of the insulating elements and closing the upper ends of the load lead passageways, and that can be knocked out by the daggers when the fuse block is to be used with the discontinuous conductors instead of the continuous conductors in the load lead passageways.

4. A fuse block for use in panel boards having a pair of parallel bus bars for branch circuit supply comprising: two complementary moulded half sections of insulator material secured together in complementary relation to provide an elongate insulator housing having a pair of spaced bus bar passageways extending transversely therethrough for mounting of said block crosswise on said panel board bus bars; a pair of spaced apart fuse receptacles symmetrically located longitudinally of said block and extending downwardly therein for communication with a respective bus bar passageway; a load terminal well formed in each end of said block; a pair of load lead passageways, one each communicating a respective fuse receptacle with an adjacent end of said block, said load lead passageway opening into the upper half section of a respective fuse receptacle and having one portion extending substantially horizontally outwardly therefrom toward an adjacent end of said block, and another portion substantially vertically downwardly therein for communication with a respective said load terminal well; a conductive fuse connector ring located in each said receptacle for contacting and threadably securing a fuse therein; a conductive fuse ring lead member formed integrally of said fuse ring extending into said vertical portion of said load lead passageway from the upper end thereof; a load terminal located in each said load terminal well; a conductive load terminal lead member secured to each said load terminal and extending into said vertical portion of each said load lead passageway from the lower end thereof; knock-out portions in said block superadjacent each said vertical portion of said passageway, said portions being readily fracturable for access to said ring and terminal leads therein; conductive probe means for each said passageway removably insertable therein to contact said ring and terminal lead members therein and establish a conductive path between said ring and said terminal; and projecting shoulder portions adapted to be received within corresponding recesses to form an extended zig-zag-like creep path between said fuse rings.

5. A fuse block for use in panel boards having a pair of parallel bus bars for branch circuit supply comprising: two complementary moulded half sections of insulator material secured together in complementary relation to provide an elongate insulator housing, having a pair of spaced bus bar passageways extending transversely therethrough for mounting of said block crosswise on said panel board bus bars; a pair of spaced apart fuse receptacles symmetrically located longitudinally of said block and extending downwardly therein for communication with a respective bus bar passageway; a load terminal well formed in each end of said block, a pair of load lead passageways, one each communicating a respective fuse receptacle with an adjacent end of said block, said load lead passageways having one portion extending substantially horizontally outwardly therefrom toward an adjacent end of said block and another portion substantially vertically downwardly therein for communication with a respective said load terminal well; conductive fuse connector rings located in each said receptacle for contacting and threadably securing a fuse therein; conductive fuse ring lead members formed integrally of said fuse rings projecting into an upper portion of said vertical portions of said passageways; a load terminal located in each said load terminal well; a conductive load terminal lead member secured to said load terminal and projecting into a lower portion of said vertical portion of said passageways and being spaced from said ring lead members; recesses in said block superadjacent each said load lead passageway; knock-out portions of reduced section separating said recess from said load lead passageways, said portions being readily fracturable for access to said ring and terminal lead members in said passageways; and conductive probe means for each said passageway removably insertable therein to contact said ring and terminal lead members therein and establish a conductive path between said ring and said terminal.

6. A fuse block for use in panel boards having a pair of parallel bus bars for branch circuit supply comprising: two complementary moulded half sections of insulator material secured together longitudinally in complementary relation to provide an elongated insulator housing having a pair of bus bar passageways extending transversely therethrough for mounting of said block crosswise on said panel board bus bars; a pair of spaced aligned fuse receptacles symmetrically located longitudinally of said block and extending downwardly therein for communication with a respective bus bar passageway; a pair of load lead passageways one each communicating a respective fuse receptacle with an adjacent end of said block; a conductive fuse connector ring located in each fuse receptacle for contacting and securing a fuse therein, a conductive fuse ring lead member extending from said ring into said passageway from one end thereof; a load terminal on each end of said block; a terminal lead member secured to said load terminal projecting into said passageway from the other end thereof; a knock-out portion in said block superadjacent each said passageway, said portions being readily fracturable for access to said lead members in said passageways; and conductive probe connector means for each said passageway removably insertable therein to contact said ring and terminal lead members therein and establish a conductive path between same, a yoke member of insulated material shaped to overlay said fuse receptacles and obstruct removal of fuses therefrom, and carrying said conductive probe means therein in spaced apart relation oriented for insertion into said housing as aforesaid.

References Cited by the Examiner
UNITED STATES PATENTS

| 2,637,764 | 5/1953 | Maxwell | 173—330 |
| 3,056,872 | 10/1962 | Kolton | 200—133 |

FOREIGN PATENTS

| 517,318 | 1/1940 | Great Britain. |
| 623,833 | 5/1949 | Great Britain. |

BERNARD A. GILHEANY, *Primary Examiner.*

H. B. GILSON, *Assistant Examiner.*